United States Patent
Drewes

(10) Patent No.: US 8,915,142 B2
(45) Date of Patent: Dec. 23, 2014

(54) CERAMIC COMPONENT HAVING AT LEAST ONE ELECTRICAL FEEDTHROUGH, METHOD FOR ITS MANUFACTURE AND PRESSURE SENSOR WITH SUCH A COMPONENT

(75) Inventor: Ulfert Drewes, Mullheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 427 days.

(21) Appl. No.: 13/320,771

(22) PCT Filed: Apr. 12, 2010

(86) PCT No.: PCT/EP2010/054744
§ 371 (c)(1),
(2), (4) Date: Nov. 16, 2011

(87) PCT Pub. No.: WO2010/133402
PCT Pub. Date: Nov. 25, 2010

(65) Prior Publication Data
US 2012/0055256 A1    Mar. 8, 2012

(30) Foreign Application Priority Data
May 18, 2009 (DE) .......................... 10 2009 003 178

(51) Int. Cl.
*G01L 9/00* (2006.01)
*B23K 31/02* (2006.01)
*G01L 19/00* (2006.01)

(52) U.S. Cl.
CPC .......... *G01L 9/0042* (2013.01); *G01L 19/0069* (2013.01); *G01L 9/0075* (2013.01)
USPC .......... 73/753; 73/706; 228/121; 228/262.21; 228/262.51

(58) Field of Classification Search
None
See application file for complete search history.

(56) References Cited

U.S. PATENT DOCUMENTS

| | | | |
|---|---|---|---|
| 3,594,895 A | | 7/1971 | Hill |
| 3,901,772 A | | 8/1975 | Guillotin |
| 5,334,344 A | * | 8/1994 | Hegner et al. ................ 420/422 |
| 5,368,220 A | | 11/1994 | Mizuhara |
| 5,561,321 A | | 10/1996 | Hirano |
| 5,860,584 A | * | 1/1999 | Inazuru ........................ 228/121 |

(Continued)

FOREIGN PATENT DOCUMENTS

| | | |
|---|---|---|
| DE | 10 2007 030 910 A1 | 1/2009 |
| DE | 102007030910 A1 | 1/2009 |

(Continued)

OTHER PUBLICATIONS

German Search Report dated Apr. 28, 2010.

(Continued)

*Primary Examiner* — Lisa Caputo
*Assistant Examiner* — Jermaine Jenkins
(74) *Attorney, Agent, or Firm* — Bacon & Thomas, PLLC

(57) ABSTRACT

A ceramic component having at least one electrical feedthrough, comprising: a ceramic body, through which a bore extends; and a metal conductor, which is arranged at least sectionally in the bore and which is secured in the bore by means of an active hard solder, or braze, whereby the bore is sealed. The active hard solder fills an annular gap between the metal conductor and the ceramic body, characterized in that the active hard solder has a radially variable, chemical composition.

8 Claims, 1 Drawing Sheet

(56) References Cited

U.S. PATENT DOCUMENTS

| | | | |
|---|---|---|---|
| 6,156,130 A * | 12/2000 | Hegner et al. | 148/24 |
| 6,267,009 B1 * | 7/2001 | Drewes et al. | 73/718 |
| 6,653,741 B2 * | 11/2003 | Sreeram et al. | 257/781 |
| 7,663,242 B2 * | 2/2010 | Lewis et al. | 257/772 |
| 2004/0016570 A1 | 1/2004 | Yamamoto | |

FOREIGN PATENT DOCUMENTS

| | | | |
|---|---|---|---|
| EP | 0 038 584 B1 | 10/1981 | |
| EP | 0038584 A1 | 10/1981 | |
| EP | 0 332 978 A1 | 9/1989 | |
| EP | 0332978 A1 | 9/1989 | |
| EP | 0 414 872 B1 | 3/1991 | |
| EP | 0414872 A1 | 3/1991 | |
| EP | 0 490 807 B1 | 6/1992 | |
| EP | 0490807 A2 | 6/1992 | |
| JP | 070 99134 A | 4/1995 | |
| JP | 07099134 A | 4/1995 | |

OTHER PUBLICATIONS

International Preliminary Examination Report of corresponding International Application No. PCT/EP2010/054744 dated Dec. 8, 2011.

International Search Report of corresponding International Application No. PCT/EP2010/054744 dated Aug. 26, 2010.

* cited by examiner

CERAMIC COMPONENT HAVING AT LEAST ONE ELECTRICAL FEEDTHROUGH, METHOD FOR ITS MANUFACTURE AND PRESSURE SENSOR WITH SUCH A COMPONENT

TECHNICAL FIELD

The present invention relates to a ceramic component having at least one electrical feedthrough, its manufacture and a pressure sensor with such a component.

BACKGROUND DISCUSSION

Ceramic materials are especially advantageous in process technology, because they exhibit good media resistance and temperature stability. Furthermore, many ceramic materials have excellent elastic properties, so that they are applied, for example, for manufacturing pressure sensors. In the case of technical devices, it is often required to provide an electrical contact through a ceramic material, for example, in order to implement the electrical transducer of a pressure sensor. Electrical feedthroughs are produced, for example, by melted glass encasing of metal conductors, when the feedthroughs are to be implemented in metal housings. In the case of ceramic components, feedthroughs are implemented also by the soldering in of a metal conductor of the ceramic component. In such case, it is especially to be heeded, when a pressure sensor is involved, that the solder connection be mechanically strong, high vacuum tight and compatible with the other process steps of the manufacture of the pressure sensor containing the ceramic component.

In European Patent EP 0 414 872 B1, a pressure sensor is disclosed, in the case of which, in a ceramic body comprising aluminum oxide, metal conductors are secured with a silver-copper-, or a silver-copper-indium solder. For increasing reactivity, reactive elements, such as titanium, zirconium, beryllium or tantalum, are added to this solder. This solder proves to be disadvantageous, however, since the coefficients of thermal expansion of the solder and the aluminum oxide ceramic are not ideally matched to one another. Furthermore, the further manufacturing of the pressure sensor proves to be difficult, since the connecting of the measuring membrane of the pressure sensor with the platform of the pressure sensor requires a high temperature soldering process in vacuum, in the case of which a zirconium-nickel-titanium-active braze is used. The conductor in the bore through the platform, and, respectively, the measuring membrane, must be soldered in the same process. Insofar, the process parameters must be so selected that the two soldering processes, thus the joining of the measuring membrane with the platform and the soldering in of the conductor into the bores can occur synchronously. For this, there remains only a relatively narrow temperature range, which makes the process very complicated and error prone.

SUMMARY OF THE INVENTION

It is, therefore, an object of the present invention to provide a ceramic component with an electrical feedthrough and a method for its manufacture, which overcome the disadvantages of the state of the art. It is additionally an object of the present invention to provide a pressure sensor, which contains a component of the invention.

These objects are achieved according to the invention by the ceramic component having at least one electrical feedthrough, comprising: a ceramic body, through which a bore extends; and a metal conductor, which is arranged at least sectionally in said bore and which is secured in said bore by means of an active hard solder, or braze, whereby the bore is sealed, wherein: said active hard solder fills an annular gap between the metal conductor and the ceramic body; characterized in that the active hard solder has a radially variable, chemical composition by a pressure sensor comprising: a platform having a ceramic component; a ceramic body, through which a bore extends; and a metal conductor, which is arranged at least sectionally in said bore and which is secured in said bore by means of an active hard solder, or braze, whereby the bore is sealed, wherein: said active hard solder fills an annular gap between the metal conductor and the ceramic body; characterized in that the active hard solder has a radially variable, chemical composition; a measuring membrane, which is joined with said platform along a perimetral edge by means of an active hard solder; and an electrical transducer for transducing a pressure dependent deformation of said measuring membrane into an electrical signal, wherein: said electrical transducer is contacted via at least one electrical feedthrough and by a method for manufacturing a ceramic component having at least one electrical feedthrough, comprising: providing a ceramic body, through which a bore extends; coating a metal conductor with an active braze; introducing the coated metal conductor into the bore; and securing the conductor in the bore, with sealing of the bore, by means of a vacuum soldering process, wherein: the coating of the conductor occurs in a sputter process; and the coating has a radially variable, chemical composition as defined in independent claim 7.

The ceramic component of the invention having at least one electrical feedthrough comprises: a ceramic body, through which a bore extends; and a metal conductor, which is arranged at least sectionally in the bore and which is secured in the bore by means of an active hard solder, or braze, whereby the bore is sealed; wherein the active hard solder fills an annular gap between the metal conductor and the ceramic body; and wherein, according to the invention, the active hard solder has a radially variable chemical composition.

In a further development of the invention, the active hard solder comprises a Zr—Ni—Ti alloy, wherein the nickel fraction has a higher concentration at the interface with the metal electrical conductor at the interface with the ceramic body. In an embodiment of this further development of the invention, the titanium fraction of the active hard solder has a higher concentration at the interface with the ceramic body than at the interface with the metal conductor.

The metal conductor can comprise, especially, tantalum, platinum or Kovar.

The ceramic body in a currently preferred embodiment of the invention comprises an aluminum oxide ceramic, especially corundum.

The pressure sensor of the invention comprises: a platform comprising a ceramic component of the invention; a measuring membrane, which is joined with the platform along a perimetral edge by means of an active hard solder; and an electrical transducer for transducing a pressure dependent deformation of the measuring membrane into an electrical signal; wherein the electrical transducer is contacted via the at least one electrical feedthrough.

The method of the invention for manufacturing a ceramic component having at least one electrical feedthrough comprises: providing a ceramic body, through which a bore extends; coating a metal conductor with an active braze; introducing the coated metal conductor into the bore; and securing the conductor in the bore, with sealing of the bore, by means of a vacuum soldering process; wherein, according to the invention, the coating of the conductor occurs in a sputter process, wherein the coating has a radially variable, chemical composition.

The active braze can comprise, especially, a Zr—Ni—Ti alloy, wherein the coating of the conductor comprises sputtering a Ni layer, or a layer with an increased Ni fraction relative to the average value of the Ni fraction of the active braze layer, at the interface with the metal conductor.

The coating of the conductor at the interface of the active braze layer facing away from the conductor can comprise, especially, the sputtering of a Ti layer or a layer with an increased Ti fraction relative to the average value of the Ti fraction of the active braze layer.

BRIEF DESCRIPTION OF THE DRAWINGS

The invention will now be explained in greater detail based on the examples of embodiments illustrated in the drawing, the figures of which show as follows.

DETAILED DISCUSSION IN CONJUNCTION WITH THE DRAWINGS

Figure 1:
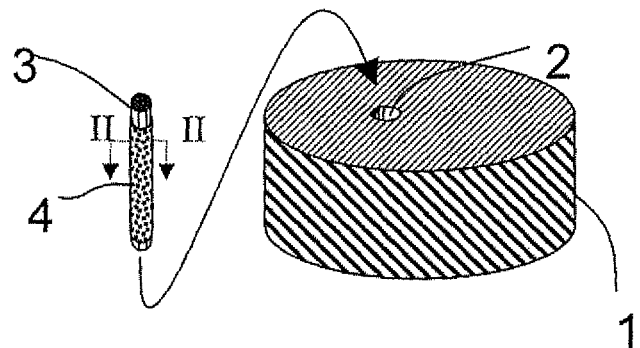
FIG. 1 shows the parts of a ceramic component of the invention.

The ceramic body 1 shown in FIG. 1 comprises a disk of aluminum oxide ceramic having, for example, a thickness of 8 mm and a diameter of 25 mm. Through the ceramic disk there extends, in the axial direction, a bore 2.

Figure 2:
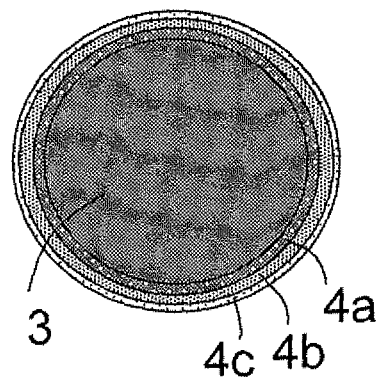
FIG. 2 is a cross section through a coated conductor of a ceramic component of the invention taken along the cutting plane II-II of FIG. 1.

Introduced into the bore 2 is a tantalum pin 3, which has on its lateral surface a coating 4 of a Ni—Zr—Ti active braze. The radius of the coated pin is, in such case, so dimensioned, that it is seats tightly in the bore 2 upon being pressed into place. The layer sequence the active braze coating 4 is shown in FIG. 2, which is a cross section through the coated tantalum pin 3 taken along the cutting plane II-II of FIG. 1. Immediately on the tantalum pin is a sputter deposited, nickel layer 4a, on which is sputtered a zirconium-nickel-titanium layer 4b. Sputtered onto this layer is, in turn, a titanium layer, in order to increase the reactivity with the ceramic material. The tantalum pin can have, for example, a diameter of 0.7 mm, while the thickness of the nickel layer 4a can be, for example, 10-100 nanometer. A suitable layer thickness for the zirconium-nickel-titanium-layer 4b amounts to, for example, about 10 micrometer. The terminating titanium layer 4c can have, for example, a thickness between 10 and 100 nanometers.

The transitions between the layers need not be sharply defined, but, instead the transitions between the layer portions can be prepared by steady varying of the concentrations of the sputtered on components.

Figure 3:
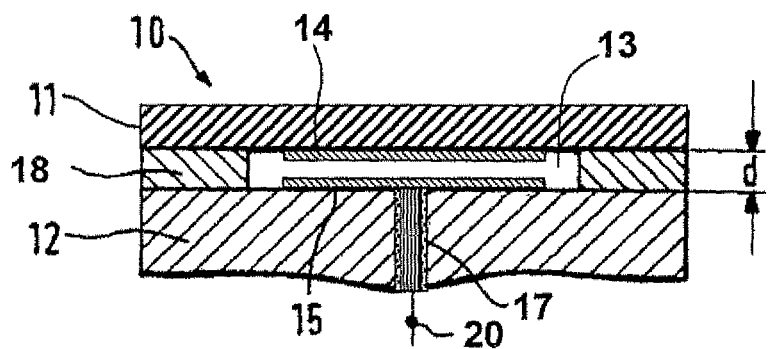
FIG. 3 is a longitudinal section through a pressure sensor of the invention.

FIG. 3 then shows a pressure sensor 10 of the invention, which has a ceramic measuring membrane 11 and a ceramic platform 12, wherein the platform is a ceramic component of the invention. Between the measuring membrane 11 and the platform 12 is formed a pressure chamber 13, which, in the case of an absolute pressure sensor, is evacuated, and, in the case of a relative pressure sensor, is connected, via a bore (not shown) through the platform, with atmospheric pressure. The measuring membrane 11 is coated with a measuring electrode 14 and the platform 12 with a counter electrode 15. The measuring electrode 14 and the counter electrode 15 can comprise, for example, tantalum or a glass-metal layer, wherein the glass-metal layer can especially contain gold and/or platinum as the metal.

The counter electrode is contacted via an electrical feedthrough 17, wherein the electrical feedthrough comprises a tantalum pin, which, according to the invention, is coated with a zirconium-nickel-titanium active braze. Between the platform and the measuring membrane is arranged a ring 18, which comprises a zirconium-nickel-titanium active braze, via which the distance d between the measuring membrane 11 and the platform 12 is set. The platform and the measuring membrane are connected pressure-tightly with one another in a high temperature vacuum soldering process, wherein, in the same soldering process, the tantalum pin of the electrical feedthrough 17 is secured pressure-tightly in the platform.

The measuring electrode can be contacted, for example, via the ring 18 from the lateral surface of the pressure sensor.

The invention claimed is:

1. A ceramic component having at least one electrical feedthrough, comprising:
a ceramic body, through which a bore extends; and
a metal conductor, which is arranged at least sectionally in said bore and which is secured in said bore by means of an active hard solder, or braze, whereby the bore is sealed, wherein:
said active hard solder fills an annular gap between the metal conductor and the ceramic body; characterized in that the active hard solder has a radially variable, chemical composition;
wherein said active hard solder comprises a Zr-Ni-Ti alloy; and
a nickel fraction at an interface with said metal electrical conductor has a higher concentration than at an interface with said ceramic body.

2. The ceramic component as claimed in claim 1, wherein:
a titanium fraction of said active hard solder at said interface with said ceramic body has a higher concentration than at said interface with said metal conductor.

3. The ceramic component as claimed in claim 1, wherein:
said metal conductor comprises tantalum, platinum or Kovar.

4. The ceramic component as claimed in claim 1, wherein:
said ceramic body comprises an aluminum oxide ceramic, especially corundum.

5. A pressure sensor, comprising:
a platform having a ceramic component;
a ceramic body, through which a bore extends; and
a metal conductor, which is arranged at least sectionally in said bore and which is secured in said bore by means of an active hard solder, or braze, whereby the bore is sealed, wherein:
said active hard solder fills an annular gap between the metal conductor and the ceramic body; characterized in that the active hard solder has a radially variable, chemical composition;
a measuring membrane, which is joined with said platform along a perimetral edge by means of an active hard solder; and
an electrical transducer for transducing a pressure dependent deformation of said measuring membrane into an electrical signal, wherein:
said electrical transducer is contacted via at least one electrical feedthrough.

6. A method for manufacturing a ceramic component having at least one electrical feedthrough, comprising:
providing a ceramic body, through which a bore extends;
coating a metal conductor with an active braze;

introducing the coated metal conductor into the bore; and
securing the conductor in the bore, with sealing of the bore, by means of a vacuum soldering process, wherein:
the coating of the conductor occurs in a sputter process; and
the coating has a radially variable, chemical composition.

7. The method as claimed in claim 6, wherein:
the active braze comprises a Zr-Ni-Ti alloy; and
the coating of the conductor comprises sputtering a Ni layer, or a layer with an increased Ni fraction relative to the average value of the Ni fraction of the active braze layer, at an interface with the metal conductor.

8. The method as claimed in claim 6, wherein:
the coating of the conductor at an interface of the active braze layer facing away from the conductor comprises sputtering of a Ti layer or a layer with an increased Ti fraction relative to the average value of the Ti fraction of the active braze layer.

* * * * *